Patented June 6, 1950

2,510,364

UNITED STATES PATENT OFFICE 2,510,364

REACTION OF BETA-LACTONES WITH ORGANIC MAGNESIUM HALIDES

Ralph A. Bankert, Akron, Ohio, assignor to The B. F. Goodrich Company, New York, N. Y., a corporation of New York No Drawing. Application January 16, 1948, Serial No. 2,816

9 Claims. (Cl. 260—526)

This invention relates to the reaction of beta-lactones with organic magnesium halides whereupon alpha-beta unsaturated ketones and beta-halo carboxylic acids are formed, and relates more particularly to the reacion of beta-propiolactone with organic magnesium halides to form vinyl ketones and beta-halo propionic acids.

In U. S. Patent 2,356,459, to Frederick E. Küng, an economical method of preparing lactones of beta-hydroxy monocarboxylic acids by the reaction of a ketene with a carbonyl compound such as an aldehyde or ketone is disclosed. The ease with which such lactones are now obtained makes it desirable to use these compounds as starting materials in the synthesis of many valuable compounds, including alpha-beta unsaturated ketones and beta-halo carboxylic acids all of which are quite useful as chemical intermediates and for various other purposes.

I have now discovered that beta-lactones will react with Grignard reagents, that is, organic magnesium halides of the formula $R_1MgX$, wherein $R_1$ is a hydrocarbon radical, and X is halogen, to form alpha-beta unsaturated ketones and beta-halo carboxylic acids. This reaction is unusual in that the beta-lactone reacts with all the components present in a Grignard equilibrium mixture.

The beta-lactones which are reacted with organic magnesium halides to form alpha-beta unsaturated ketones and beta-halo carboxylic acids contain at least one hydrogen atom on the alpha carbon atom and possess the formula

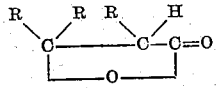

wherein each R is hydrogen or a hydrocarbon radical which may be either an alkyl, aryl, cycloalkyl, aralkyl, alkaryl or other hydrocarbon radical but is preferably an alkyl radical containing from 1 to 4 carbon atoms. Examples of such beta-lactones are beta-propiolactone, beta-cyclohexyl-beta-propiolactone, beta-benzyl-beta-propiolactone, beta-phenyl-beta-propiolactone, alpha-ethyl-beta-propiolactone, beta-butyrolactone (i. e., beta-methyl-beta-propiolactone) beta-isovalerolactone (i. e., beta, beta′-dimethyl-beta-propiolactone), beta-valerolactone (i. e., beta-ethyl-beta-propiolactone), beta-butyl-beta-propiolactone, alpha-methyl-beta-propiolactone, alpha-ethyl-beta-propiolactone, alpha-isopropyl-beta-propiolactone, alpha-butyl-beta-propiolactone, alpha-methyl-beta-butyrolactone, beta-cyclohexyl - beta - butyrolactone, alpha-ethyl- beta-butyrolactone, alpha-ethyl-beta-valerolactone, beta-methyl-beta-valerolactone, alpha-beta-dimethyl-beta-valerolactone, and the like. Beta-propiolactone, possessing the formula

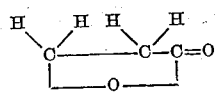

can be economically prepared from ketene and formaldehyde and is the especially preferred beta-lactone for use in the reaction with organic magnesium halides although other saturated aliphatic beta-lactones, especially those containing less than 10 carbon atoms, also react quite readily.

Any compound possessing the formula $R_1MgX$, wherein $R_1$ and X have the meaning set forth hereinabove may be reacted with any of the above-described beta-lactones in accordance with this invention. Included in this class of compounds are methyl magnesium bromide, propyl magnesium bromide, ethyl magnesium bromide, butyl magnesium bromide, isopropyl magnesium bromide, tertiary-butyl magnesium bromide, phenyl magnesium bromide, alpha-napthyl magnesium bromide, methyl magnesium chloride, ethyl magnesium chloride, isopropyl magnesium chloride, 9-phenanthryl magnesium bromide, benzyl magnesium bromide, triphenyl methyl magnesium chloride, allyl magnesium chloride, n-hexyl magnesium chloride, butenyl magnesium bromide, 2-bi-phenyl-magnesium iodide, methyl magnesium iodide and the like.

In carrying out the reaction it is important that the organic magnesium halide and the beta-lactone first be brought together under anhydrous conditions since the presence of water causes the Grignard compound to decompose. It is desirable that the organic magnesium halide be utilized in solution in an ether such as ethyl ether, butyl ether, anisole and the like, although other inert water-immiscible organic solvents such as benzene, toluene, xylenes and the like are also suitable, or the organic magnesium halide may be used without a solvent so long as water is not present.

When the beta-lactone and the Grignard compound are brought together in this manner, reaction occurs to form a complex addition compound which is then decomposed, by treating the reaction mixture with an aqueous solution of a mineral acid, to give, as reaction products, an alpha-beta unsaturated ketone and a beta-halo carboxylic acid.

The Grignard compounds exist in solution as an equilibrium mixture which may be represented as follows:

$$2R_1MgX \rightleftarrows (R_1)_2Mg + MgX_2$$

The alpha-beta unsaturated ketone is formed by the reaction of the beta-lactone with $R_1MgX$ and $(R_1)_2 Mg$ components of the equilibrium mixture according to the following equations:

(a)

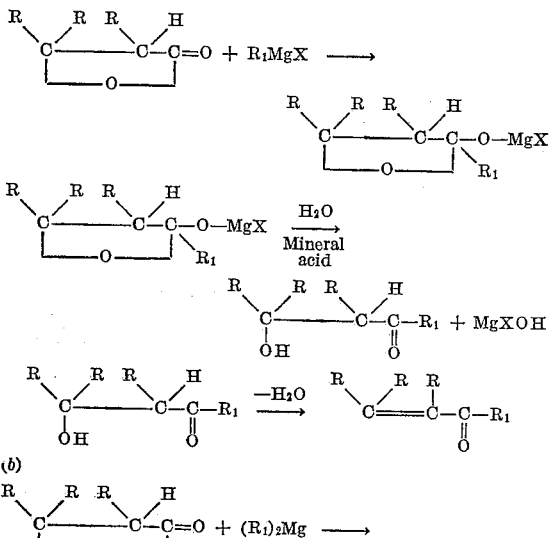

(b)

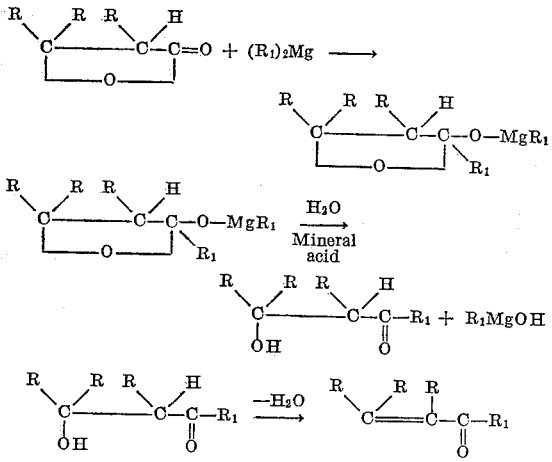

wherein R is either hydrogen or a hydrocarbon radical, $R_1$ is a hydrocarbon radical and X is a halogen atom.

The beta-halo carboxylic acid is formed by reaction of the beta-lactone with the $MgX_2$ component of the equilibrium mixture. This reaction proceeds substantially as follows:

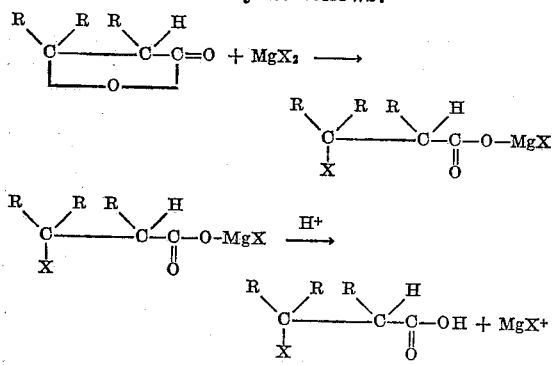

wherein R and X have the meaning set forth hereinabove.

The quantities of the reactants used are not critical and may be varied widely. For example, the molar ratio of beta-lactone to organic magnesium halide may be as low as 1:5 or lower and as high as 10:1 or even higher. However, since polymerization of the lactone (polyester formation) is a troublesome side reaction favored by an excess of beta-lactone, it is desirable that the beta-lactone and organic magnesium halide be reacted in equimolecular proportions or with a slight excess of the organic magnesium halide, in which event only a negligible amount of polymer formation occurs.

The beta-lactone and organic magnesium halide reactants may be brought together in any desired manner provided anhydrous conditions are used. Preferably, however, a solution of the beta-lactone in an inert water-immiscible solvent is slowly added to a solution of the organic magnesium halide in the same or a miscible inert solvent. It is desirable that the reaction temperature be maintained during the addition below about 25° C. and preferably from —20° C. to 0° C., although these temperatures are not critical and the temperature of the mixture may be even higher than room temperature with good results. The complex addition product, formed by the organic magnesium halide adding to the carbonyl group of the lactone, is then decomposed preferably by adding it to an aqueous solution of a mineral acid such as sulfuric acid, hydrochloric acid, phosphoric acid, or the like. At this point the reaction mixture contains the alpha-beta unsaturated ketone, the beta-halo carboxylic acid and a small amount of beta-lactone polymer, as well as water and residual organic solvent, if any solvent was used, inorganic products of the reaction, and any unreacted materials. The alpha-beta unsaturated ketone may then be recovered from the reaction mixture (without necessarily isolating the beta-halo carboxylic acid) in any desired manner, for example, by distilling the reaction mixture. Preferably, however, the reaction mixture is further treated to remove the solid beta-lactone polymer, as by filtration, and the remaining reaction mixture extracted with additional water-immiscible organic solvent such as ether, benzene, toluene, xylene, or the like to remove the other organic products. The solution containing the extract is then washed with an aqueous alkali solution to remove the beta-halo carboxylic acid in the form of the alkali metal salt of the acid, and also to remove small amounts of the mineral acid which remain in the extract. The washed solution, that is, the water-immiscible solvent phase, is then distilled to recover the pure alpha-beta unsaturated ketone.

The beta-halo carboxylic acid is then recovered, if desired, from the aqueous phase, that is from the alkali washing solutions, by acidifying the aqueous phase with a strong mineral acid. The beta-halo carboxylic acid separates as an oil which may be recovered and purified in any desired manner, as by extracting with a water-immiscible organic solvent, distilling off the solvent and crystallizing the acid from an appropriate solvent in the usual way.

The following specific examples, wherein beta-propiolactone is the beta-lactone reacted with the organic magnesium halide, illustrate the reaction of this invention but are not intended to limit the invention for there are, of course, numerous variations and modifications. All parts are by weight.

*Example I*

72 parts (1 mole) of beta-propiolactone in 50 parts of ethyl ether are added to a solution of 1 mole of phenyl magnesium bromide in 284 parts of ether over a period of 75 minutes at a temperature of −5° to 23° C. and with constant stirring. The reaction product is then decomposed by gradual addition to 610 parts of 30% sulfuric acid. The insoluble beta-propiolactone polymer is filtered off and the filtrate extracted with 426 parts of ethyl ether. The ether solutions are washed with saturated sodium bicarbonate solution to remove traces of sulfuric acid and the ether solution dried over anhydrous sodium sulfate. The product remaining after removal of the ether is then distilled through a column containing a stainless steel spiral. Vinyl phenyl ketone (B. P. 117° to 118° C.) is thus obtained in good yield. The vinyl phenyl ketone is identified by preparing the diphenyl pyrazoline derivative, 1,3-diphenylΔ²pyrazoline,

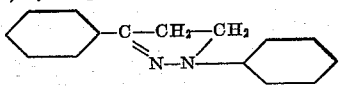

M. P. 151°–153° C. A mixed melting point with an authentic sample of 1,3-diphenylΔ²pyrazoline is 151–153° and analysis of the derivative gives the following results.

|  | Found | Calculated for 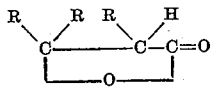 |
|---|---|---|
| Per cent H | 6.33 | 6.35 |
| Per cent C | 81.02 | 81.05 |
| Per cent N | 12.61 | 12.60 |
| M. W | 219 | 222 |

The sodium bicarbonate solutions used in washing the ether solution of the reaction product, containing the alkali metal salt of the beta-halo-carboxylic acid are made strongly acid with concentrated sulfuric acid, whereupon a colorless oil separates. The oil is extracted with ether and the ether solution dried over anhydrous sodium sulfate. The ether is removed by distillation and 64 parts (43%) of beta-bromo-propionic acid (a yellow crystalline solid, M. P. 60.5° to 61.5° C., neutralization equivalent 153.5) are obtained.

*Example II*

A solution of 72 parts (1 mole) of beta-propiolactone in 54 parts ether are added to 1.0 mole of methyl magnesium iodide in 426 parts of ether over a period of 35 minutes at a temperature of −10° to 13° C. After the addition of the lactone is complete, the reaction mixture is warmed to room temperature. The reaction mixture is decomposed by the gradual addition to a 30% sulfuric acid solution. 3 parts of beta-propiolactone polymer are formed and are removed from the mixture by filtering. The filtrate is three times extracted with 200 part portions of ether. The combined ether solutions are then washed with a saturated sodium bicarbonate solution. The washed ether solutions are dried over sodium sulfate and distilled at a pressure of 25 to 28 mm. Hg. 13 parts of vinyl methyl ketone are obtained. The methyl vinyl ketone is identified by preparing the derivative, 1-phenyl-3-methyl pyrazoline (M. P. 76° to 77° C) by reacting phenylhydrazine with the product of the distillation. The derivative is obtained as light yellow needles, M. P. 75.5 to 76.5° C. Microanalytical results for the derivative are as follows:

|  | Found | Calculated for CH₃—C—CH₂—CH₂ |
|---|---|---|
| Per cent H | 7.51 | 7.55 |
| Per cent C | 74.88 | 74.96 |
| Per cent N | 17.51 | 17.49 |
| M. W | 162 | 160.2 |

The aqueous sodium bicarbonate washings are made strongly acid with concentrated sulfuric acid and a red oil separates. The oil is extracted with ether and the ether solution dried over anhydrous sodium sulfate. The ether solution is distilled and 87 parts of beta-iodopropionic acid (M. P. 81° to 82° C.) are obtained.

When other beta-lactones of the formula $$\begin{array}{c} R \quad R \quad R \quad H \\ \diagdown \quad \diagup \quad \diagdown \quad \diagup \\ C \!\!-\!\!-\!\!-\!\!-\!\! C \!\!-\!\! C \!=\! O \\ \diagdown \qquad \diagup \\ O \end{array}$$

wherein R is a hydrocarbon radical, are reacted with organic magnesium halides in accordance with the invention, other alpha-beta unsaturated ketones are formed. For example, when beta-phenyl-beta-propiolactone is reacted with phenyl magnesium bromide, phenyl styryl ketone,

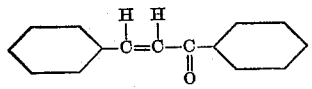

is formed; when alpha-ethyl-beta-propiolactone is reacted with phenyl magnesium bromide the unsaturated ketone of the formula

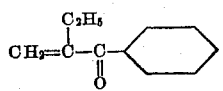

is formed; and when beta, beta'-dimethyl beta-propiolactone is reacted with ethyl magnesium chloride, ethyl isobutenyl ketone,

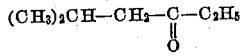

is formed.

Similarly, the beta-halo carboxylic acid formed depends upon the particular beta-lactone and organic magnesium halide used. Thus when beta-phenyl-beta-propiolactone is reacted with phenyl magnesium bromide, beta-bromo-beta-phenyl propionic acid,

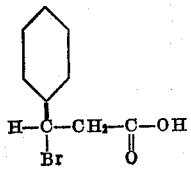

is formed and when beta-butyrolactone is reacted with methyl magnesium iodide, beta-iodo butyric acid,

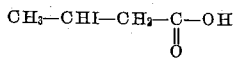

is formed.

As disclosed hereinabove, the alpha-beta unsaturated ketones formed by the reaction of this invention are very valuable chemical intermediates. For example, they may be oxidized to form a mixture of organic acids, or they may be reduced to form a secondary alcohol. Furthermore, the ketones will polymerize readily upon heating or upon standing to give hard, useful polymers.

Although the invention has been described with reference to specific examples, it is not intended to limit the invention thereto, for numerous modifications and variations will be apparent to those skilled in the art and are included within the spirit and scope of the appended claims.

I claim:

1. The method which comprises bringing together under anhydrous conditions a beta-lactone having at least one hydrogen atom on the alpha-carbon atom and a compound of the formula $R_1MgX$, wherein $R_1$ is a hydrocarbon radical and X is a halogen atom, whereupon reaction occurs to form a complex addition product, treating the reaction mixture containing said addition product with an aqueous solution of a mineral acid, whereupon the addition product is decomposed and an alpha-beta unsaturated ketone is formed, and separating the alpha-beta unsaturated ketone from the so-treated reaction mixture.

2. The method of claim 1 wherein the beta-lactone is beta-propiolactone.

3. The method which comprises bringing together under anhydrous conditions a beta-lactone having at least one hydrogen atom on the alpha-carbon atom and a compound of the formula $R_1MgX$, wherein $R_1$ is a hydrocarbon radical and X is a halogen atom, whereupon reaction occurs to form a complex addition product, treating the reaction mixture containing said addition product with an aqueous solution of a mineral acid, whereupon the addition product is decomposed and an alpha-beta unsaturated ketone and a beta-halo carboxylic acid are formed, and separating said alpha-beta unsaturated ketone and said beta-halo carboxylic acid from the so-treated reaction mixture.

4. The method which comprises bringing together under anhydrous conditions a beta lactone having at least one hydrogen atom on the alpha carbon atom, and a compound of the formula $R_1MgX$, wherein $R_1$ is a hydrocarbon radical and X is a halogen atom, whereupon reaction occurs to form a complex addition product, treating the reaction mixture containing said addition product with an aqueous solution of a mineral acid, whereupon the addition product is decomposed and a mixture containing an alpha-beta unsaturated ketone, a beta-halo carboxylic acid, and beta lactone polymer is formed, removing said lactone polymer from the mixture, and distilling the remainder of the mixture to recover the alpha-beta unsaturated ketone.

5. The method which comprises bringing together under anhydrous conditions and at a temperature of $-20°$ to $0°$ C. a beta-lactone having at least one hydrogen atom on the alpha carbon atom with an ether solution of a compound of the formula $R_1MgX$, wherein $R_1$ is a hydrocarbon radical and X is a halogen atom, whereupon reaction occurs to form a complex addition product, treating the reaction mixture containing the addition product with an aqueous solution of a mineral acid whereupon the addition product is decomposed and a mixture containing an alpha-beta unsaturated ketone, a beta-halo carboxylic acid and solid beta-lactone polymer is formed, removing the solid beta-lactone polymer from the mixture, extracting the remaining portion of the mixture with a water-immiscible organic solvent, and separating the alpha-beta-unsaturated ketone and the beta-halo carboxylic acid from the extract.

6. The method which comprises adding a solution of a saturated aliphatic beta-lactone having at least one hydrogen atom on the alpha carbon atom in an anhydrous, water-immiscible, inert organic solvent to a solution in the same solvent, of a compound of the formula $R_1MgX$, wherein $R_1$ is a hydrocarbon radical and X is a halogen atom while maintaining the temperature in the range of $-20$ to $0°$ C., whereupon reaction occurs to form a complex addition product, treating the reaction mixture containing the addition product with an aqueous solution of a mineral acid whereupon the addition product is decomposed and a mixture containing an alpha-beta unsaturated ketone, a beta-halo carboxylic acid and solid beta-lactone polymer is formed, removing the solid beta-lactone polymer from the mixture, extracting the remaining portion of the mixture with a water-immiscible organic solvent, washing the extract with aqueous alkali solution and recovering the beta-halo carboxylic acid from the aqueous phase and the alpha-beta unsaturated ketone from the water-immiscible organic solvent phase.

7. The method which comprises adding an ether solution of beta-propiolactone to an ether solution of a compound of the formula $R_1MgX$, wherein $R_1$ is a hydrocarbon radical and X is a halogen atom, while maintaining the temperature in the range of $-20$ to $0°$ C., whereupon reaction occurs to form a complex addition product, treating the reaction mixture containing the addition product with an aqueous solution of a mineral acid whereupon the addition product is decomposed and a mixture containing an alpha-beta unsaturated ketone, a beta-halo propionic acid and solid beta-propiolactone polymer is formed, removing the solid polymer from the mixture, extracting the remaining portion of the mixture with a water-immiscible organic solvent, washing the extract with aqueous alkali solution, and recovering the beta-halo propionic acid from the aqueous phase and the alpha-beta unsaturated ketone from the water-immiscible organic solvent phase.

8. The method which comprises adding an ether solution of beta-propiolactone to an ether solution of phenyl magnesium bromide while maintaining the temperature in the range of $-20$ to $0°$ C., whereupon reaction occurs to form a complex addition product, treating the reaction mixture containing the addition product with an aqueous solution of a mineral acid, whereupon the addition product is decomposed and a mixture containing phenyl-vinyl ketone, beta-bromo propionic acid and solid beta-propiolactone polymer is formed, removing the beta-propiolactone polymer, extracting the remaining portion of the mixture with ether, washing the ether solution with an aqueous sodium bicarbonate solution, distilling the washed ether solution to obtain phenyl-vinyl ketone, and acidifying the sodium bicarbonate washing solutions to obtain the beta-bromo propionic acid.

9. The method which comprises adding an ether solution of beta-propiolactone to an ether solution of methyl magnesium iodide while maintaining the temperature in the range of $-20°$ to $0°$ C., whereupon reaction occurs to form a complex addition product, treating the reaction mixture containing the addition product with an aqueous solution of a mineral acid, whereupon the addition product is decomposed and a mixture containing methyl-vinyl ketone, beta-iodopropionic acid and solid beta-propiolactone polymer is formed, removing the solid material consisting of beta-propiolactone, extracting the remaining portion of the mixture with ethyl ether, washing the ether extraction solution with an aqueous solution of sodium bicarbonate, distilling the washed ether solution to obtain methyl-vinyl ketone, and acidifying the sodium bicarbonate washing solutions to obtain beta-iodopropionic acid.

RALPH A. BANKERT.

REFERENCES CITED

The following references are of record in the file of this patent:

UNITED STATES PATENTS

| Number | Name | Date |
|---|---|---|
| 2,449,987 | Gresham | Sept. 28, 1948 |

OTHER REFERENCES

Geissman, J. Am. Chem. Soc., vol. 62, pages 1363–1367 (1940); vol. 63, pages 1111–1114 (1941); vol. 65, pages 2135–2136 (1943).

Kohn et al., Montash, vol. 34, pages 1729–1740 (1913); vol. 37, pages 37–51 (1916).

Dupont, Compt. rend., vol. 154, pages 599–601 (1912).